US007315444B2

(12) United States Patent
Chen et al.

(10) Patent No.: US 7,315,444 B2
(45) Date of Patent: Jan. 1, 2008

(54) MODULAR STRUCTURE FOR CONNECTING INTERFACE ON FRONT PANEL OF PC CASE

(75) Inventors: Yung Hsien Chen, Taipei (TW); Wen Lung Chang, Taipei (TW); Ching Yi Yeh, Taipei (TW); Tseng Shyang Lin, Taipei (TW)

(73) Assignee: Northstar Systems Corp., Taipei (TW)

(*) Notice: Subject to any disclaimer, the term of this patent is extended or adjusted under 35 U.S.C. 154(b) by 325 days.

(21) Appl. No.: 11/203,374

(22) Filed: Aug. 15, 2005

(65) Prior Publication Data

US 2007/0035915 A1 Feb. 15, 2007

(51) Int. Cl.
*G06F 1/16* (2006.01)

(52) U.S. Cl. ....................... 361/683; 439/928; 400/691

(58) Field of Classification Search ................ 439/577, 439/246, 928; 400/691–693; 347/86; 361/679–687, 361/724–727
See application file for complete search history.

(56) References Cited

U.S. PATENT DOCUMENTS

| | | | | |
|---|---|---|---|---|
| 5,122,005 | A * | 6/1992 | Kamei | 400/691 |
| 6,490,156 | B2 * | 12/2002 | Chen | 361/686 |
| 6,758,693 | B2 * | 7/2004 | Inagaki et al. | 439/577 |
| 7,200,002 | B2 * | 4/2007 | Peng et al. | 361/685 |

* cited by examiner

*Primary Examiner*—Hung Van Duong
(74) *Attorney, Agent, or Firm*—Bacon & Thomas, PLLC

(57) ABSTRACT

The present invention is a modular structure for connecting interface on front panel of pc case, which combines the case and base such that not only the connecting interfaces for input/output originally installed at back side of PC are aligned at the front panel, but all connecting interfaces which accept insertion are integrated in a modular structure as well. Consequently, PC can be connected or expanded conveniently and, with the help of one or specialized flat cables, the assembly process of connecting interface is easy.

4 Claims, 9 Drawing Sheets

MODULAR STRUCTURE FOR CONNECTING INTERFACE ON FRONT PANEL OF PC CASE

BACKGROUND OF THE INVENTION

1) Field of the Invention

The present invention is a modular structure for connecting interface on front panel of PC (personal computer) case. More specifically, the present invention is a connecting interface that integrates input/output of PC and is installed at the front panel of PC, such that the users can insert, connect, or expand peripherals easily.

2) Description of the Prior Art

The current interfaces of PC for input or output data include printer port, COM port, video I/O port, audio I/O port, USB connecting port, or IEEE 1394 port, etc, which mainly support the connection for data I/O of computer. However, the desktop PC typically installed the connecting ports mentioned above at the back side of PC. To connect these ports, the PC has to be turned oppositely for insertion and connection. After connection, the PC has to be tuned back again. Apparently, it is inconvenient for the users.

While part of the manufacturers of PC case have arranged some of the frequently used connecting port, such as audio I/O port or USB connecting port, at the front panel, there exist inconsistency of specifications between miscellaneous main boards and PC cases in addition to the difference between connecting terminals. Besides, the connecting ports provided at the front panel of PC case are not modualized standardly. Therefore, even though some connecting ports are installed at the front panel of PC case, these ports are often not usable for the users.

Moreover, currently the connecting ports provided by the manufacturers of PC case are installed independently, e.g., some provide audio connecting port only or provide USB connecting port only. The reason why manufacturers of main board and PC case did not provide connecting terminals previously is that the manufacturers of PC case did not modualize these connecting ports standardly, and the connecting ports are thus obstructed to be provided at the front panel of PC case to become a generalized specification.

SUMMARY OF THE INVENTION

In view of the deficiencies mentioned above, the main goal of modular structure for connecting interface on front panel of pc case according to the present invention is to provide a connecting interface which integrates inputs and outputs and which is installed at the front panel of PC, such that the whole structure becomes a standardized module for connecting ports on the front panel, and thus the users can insert, connected, or expand peripherals easily.

Therefore, the present invention not only takes the convenience of users into account, but as well integrates the fields of main board and PC case such that the connecting ports are modualized on the front panel of PC. Although the aforementioned key points have completely fit in with the necessary conditions for patent pending, the detailed descriptions as well as the technical contents of the present invention shall be given with the accompanying drawings hereunder.

DETAILED DESCRIPTION OF THE PREFERRED EMBODIMENTS

Figure 1:
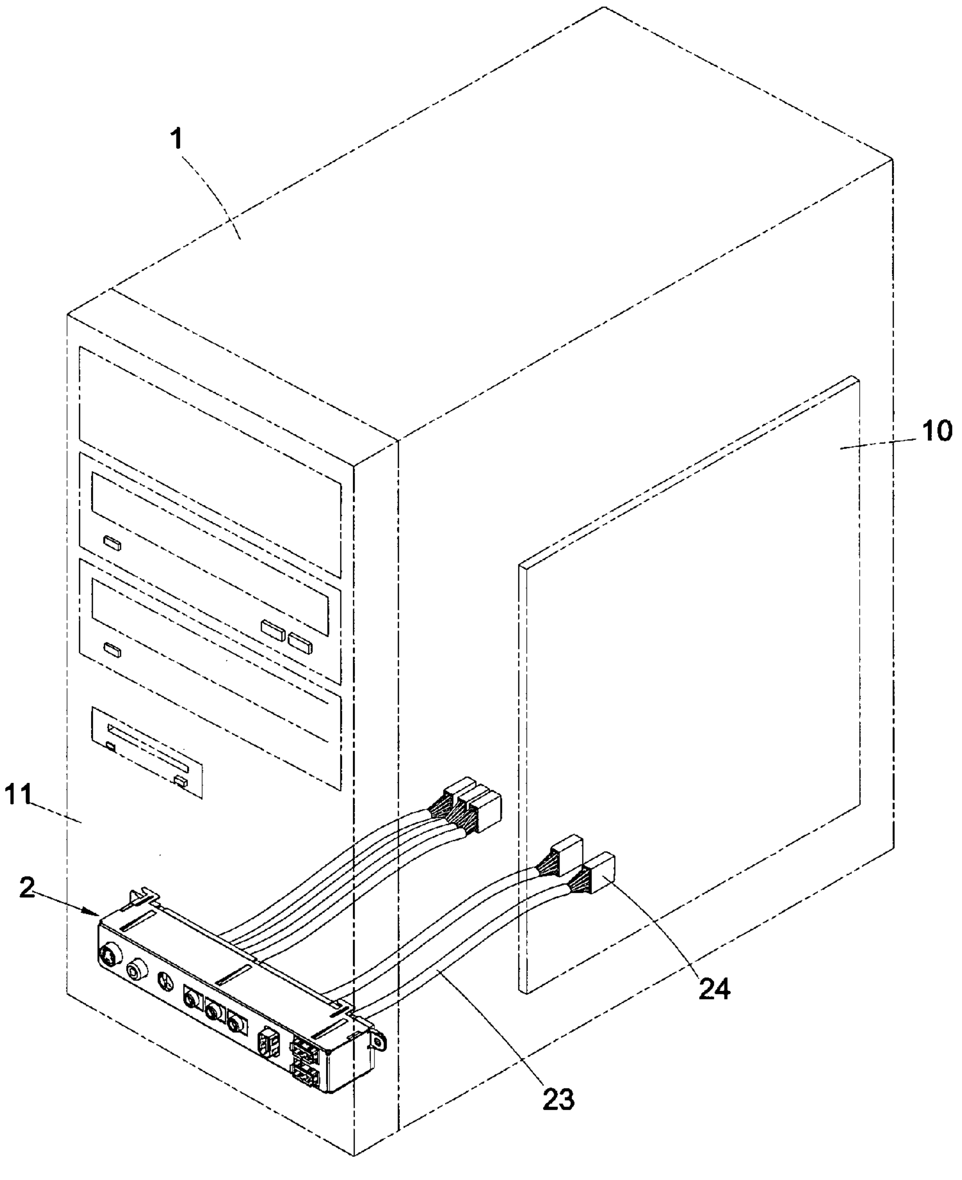
FIG. 1 is a pictorial drawing showing the embodiment according to the present invention.
Figure 2:
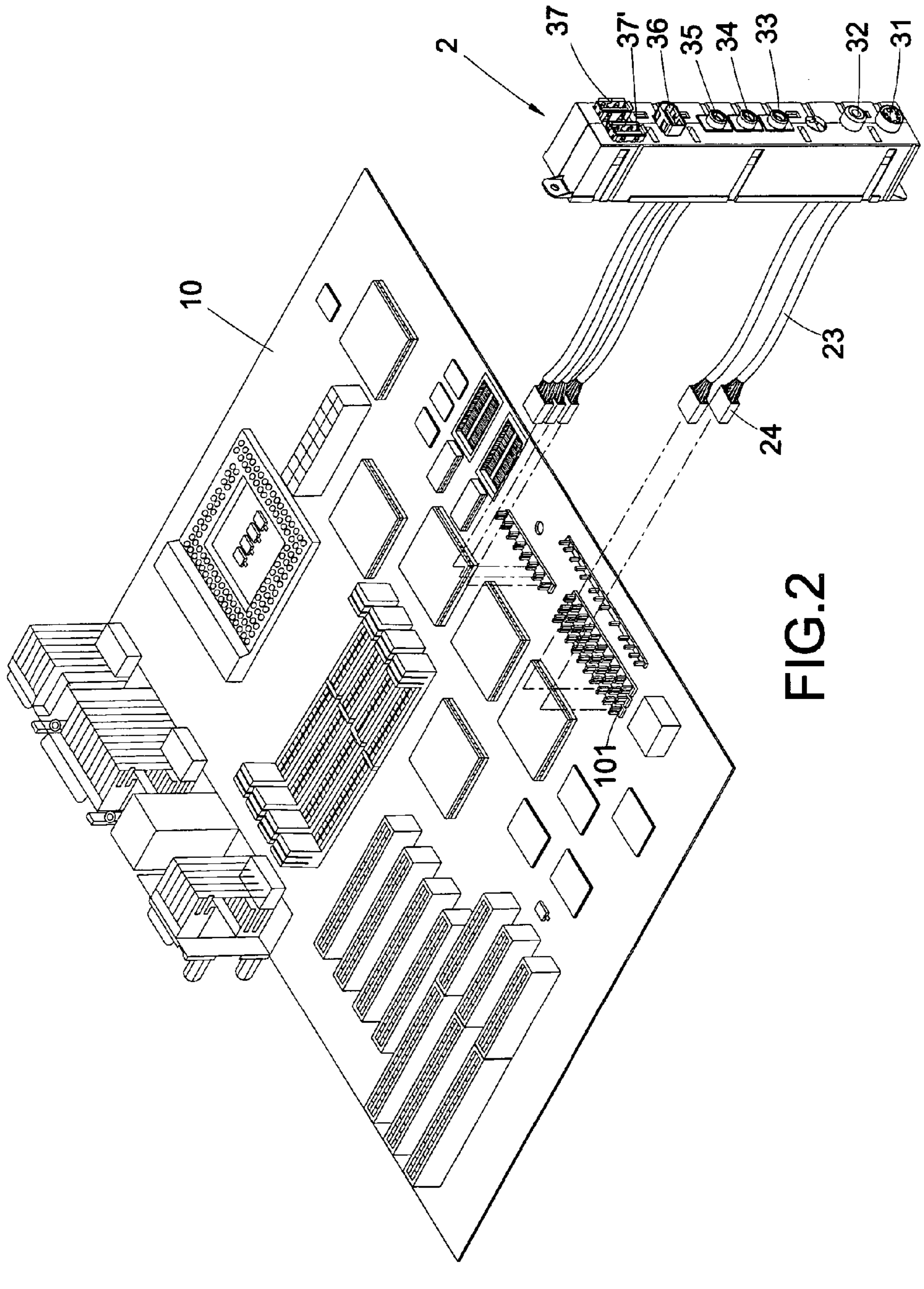
FIG. 2 is an exploded view that shows disassembling the present invention from a main board.

Referring to FIG. 1 and FIG. 2, which respectively shows the embodied status of modular structure for connecting interface on front panel of pc case according to the present invention and the exploded view of disassembling the present invention from the main board, in which the connecting interface 2 integrating connectors of various specifications at least includes: S terminal 31, video connecting port 32, audio connecting port 33, microphone output port 34, expanded audio output port 35, IEEE 1394 port 36, and USB ports 37, 37', etc. All these connecting ports are installed on a connecting interface 2, while the said connecting interface 2 is installed on the front panel 11 of PC 1.

After the connecting ports are integrated by the connecting interface 2, flat cables 23 are further provided for connecting to the mother main board, and connectors 24 are provided at the end of flat cables 23. To ease the user's installation, the said connectors 24 can be provided with specified specification to meet the connecting terminals 101 on the main board 10.

Figure 3:
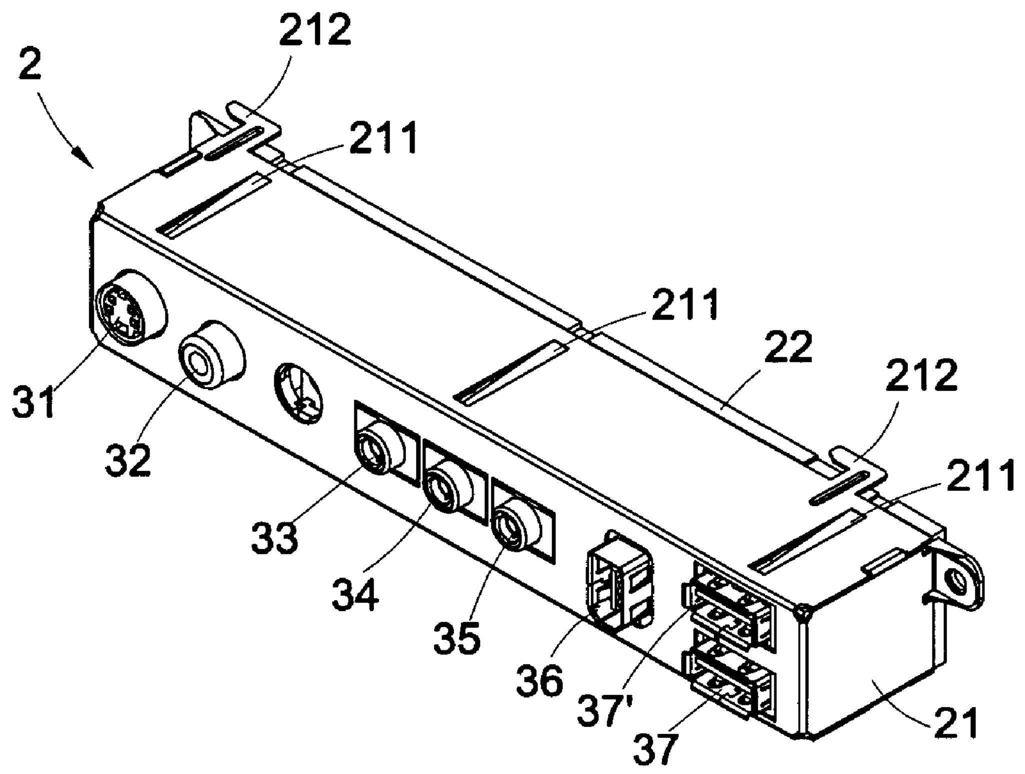
FIG. 3 shows the assembly according to the present invention.
Figure 4A:
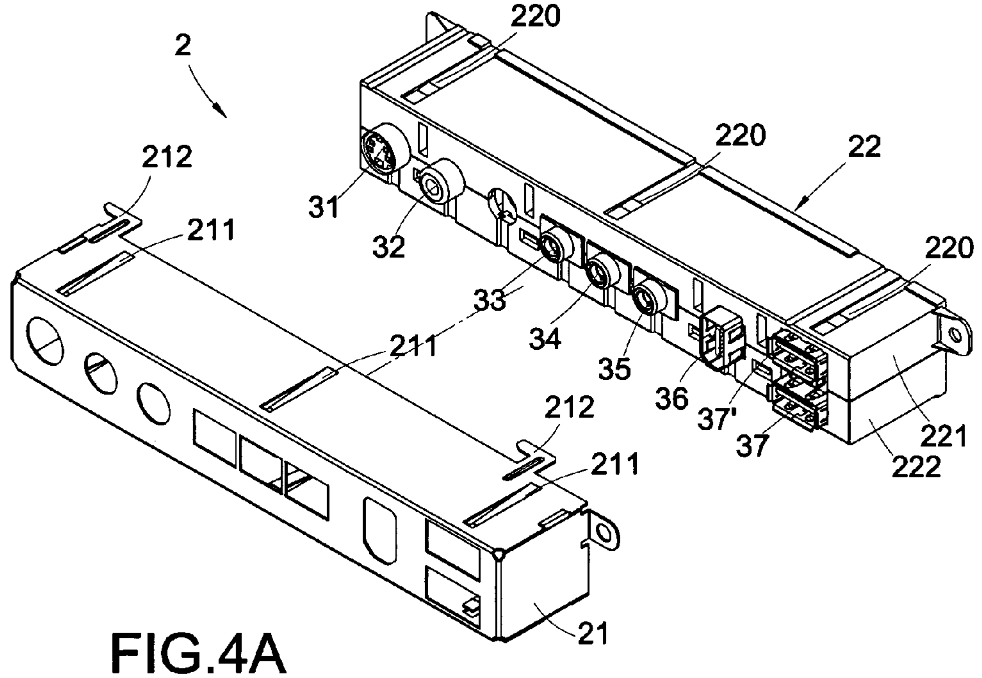
FIG. 4A shows an exploded view according to the present invention.
Figure 4B:
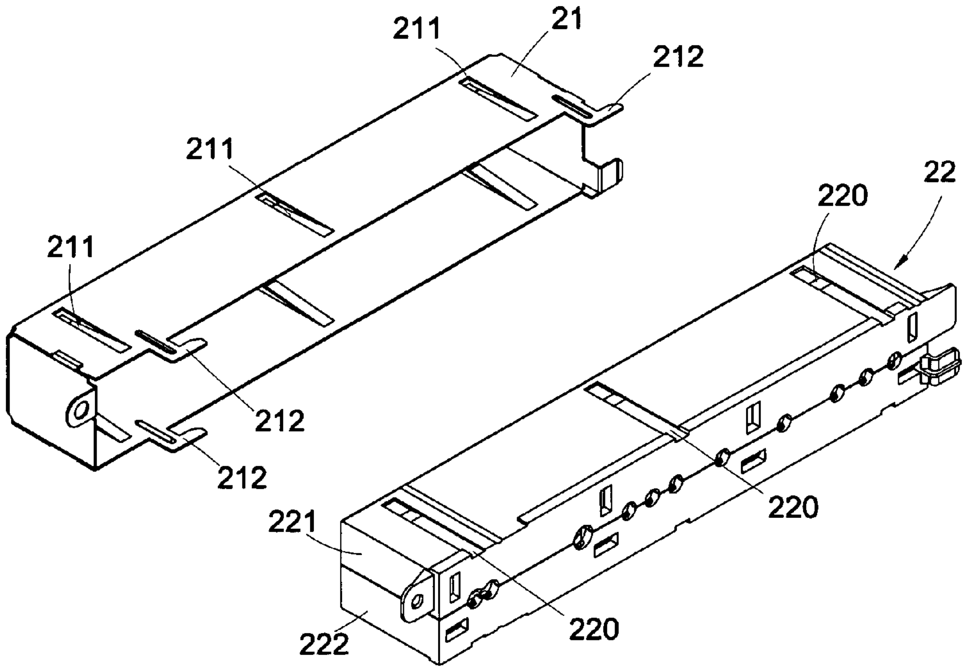
FIG. 4B shows another exploded view according to the present invention.
Figure 4C:
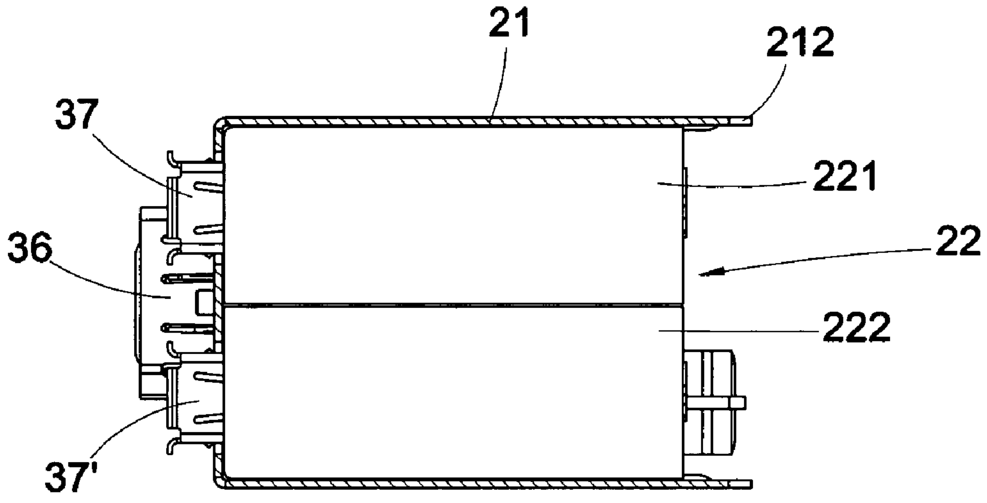
FIG. 4C is a cross-sectional view showing the assembly according to the present invention.

Further, referring to FIG. 3 and FIG. 4A, 4B, which respectively shows the assembled and explosive view of the interface module according to the present invention, in which the said connecting interface 2 is assembled from a case 21 and a base seat 22, while the said case 21 is pressed from a metal plate and is formed into a hollow container 210 to contain the base seat 22, as disclosed in FIG. 4C. Multiple resist parts 211 and lateral locker 212 are provided at the upper, lower sides of case 21, the said resist parts 211 correspond to the embed slots 220 of base seat 22 to provide a mechanism for locking during assembling. Besides, the lateral locker 212 of case 21 is provided for locking and fixing to the front panel of PC when installed to the front panel of PC.

The base seat 22 integrates various connecting ports for input/output, where the said connecting ports of various specifications at least include: S terminal 31, video connecting port 32, audio connecting port 33, microphone output port 34, expanded audio output port 35, IEEE 1394 port 36, and USB ports 37, 37', etc.

Figure 5A:
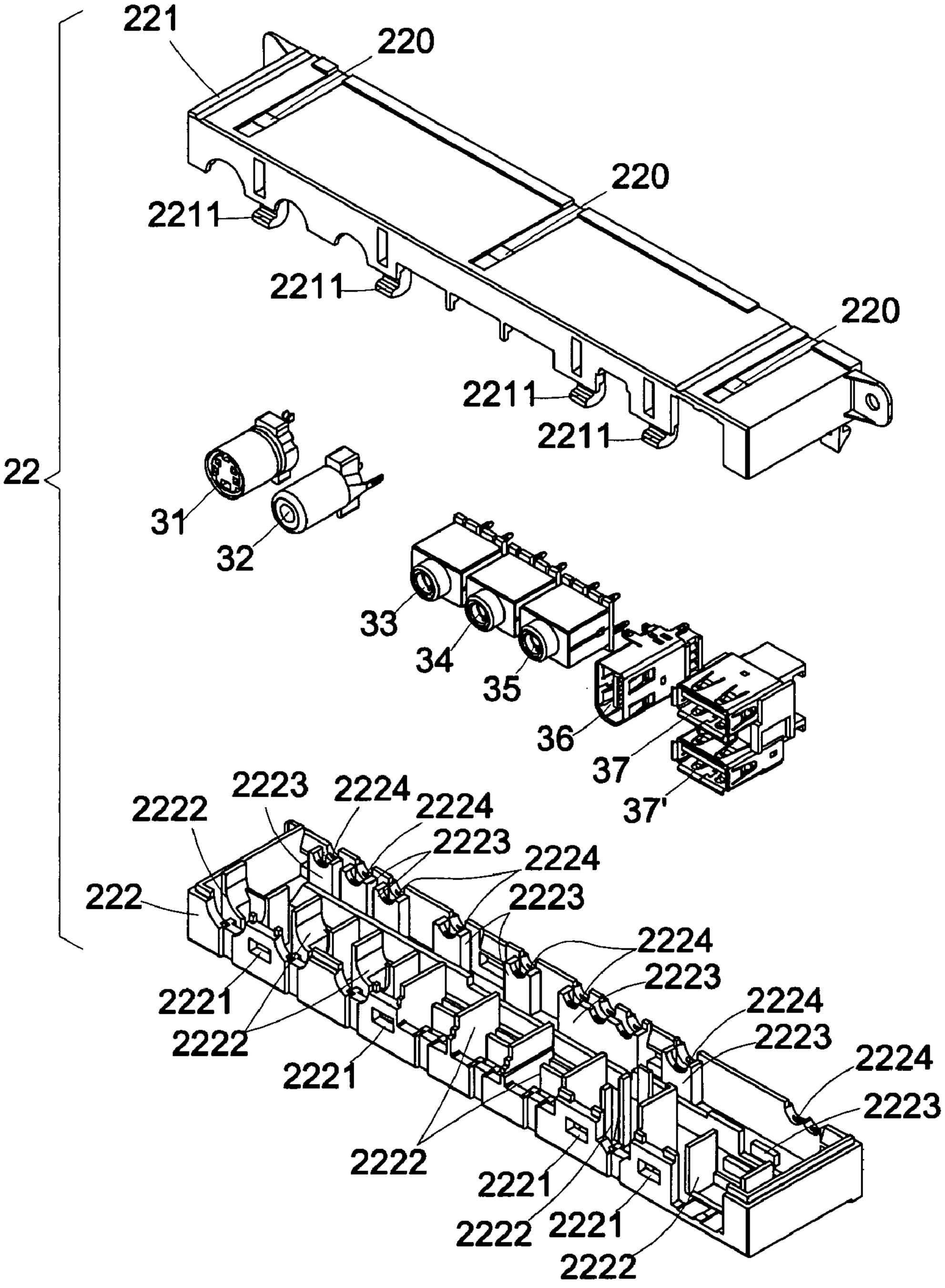
FIG. 5A is an exploded view showing the base seat and connecting ports according to the present invention.
Figure 5B:
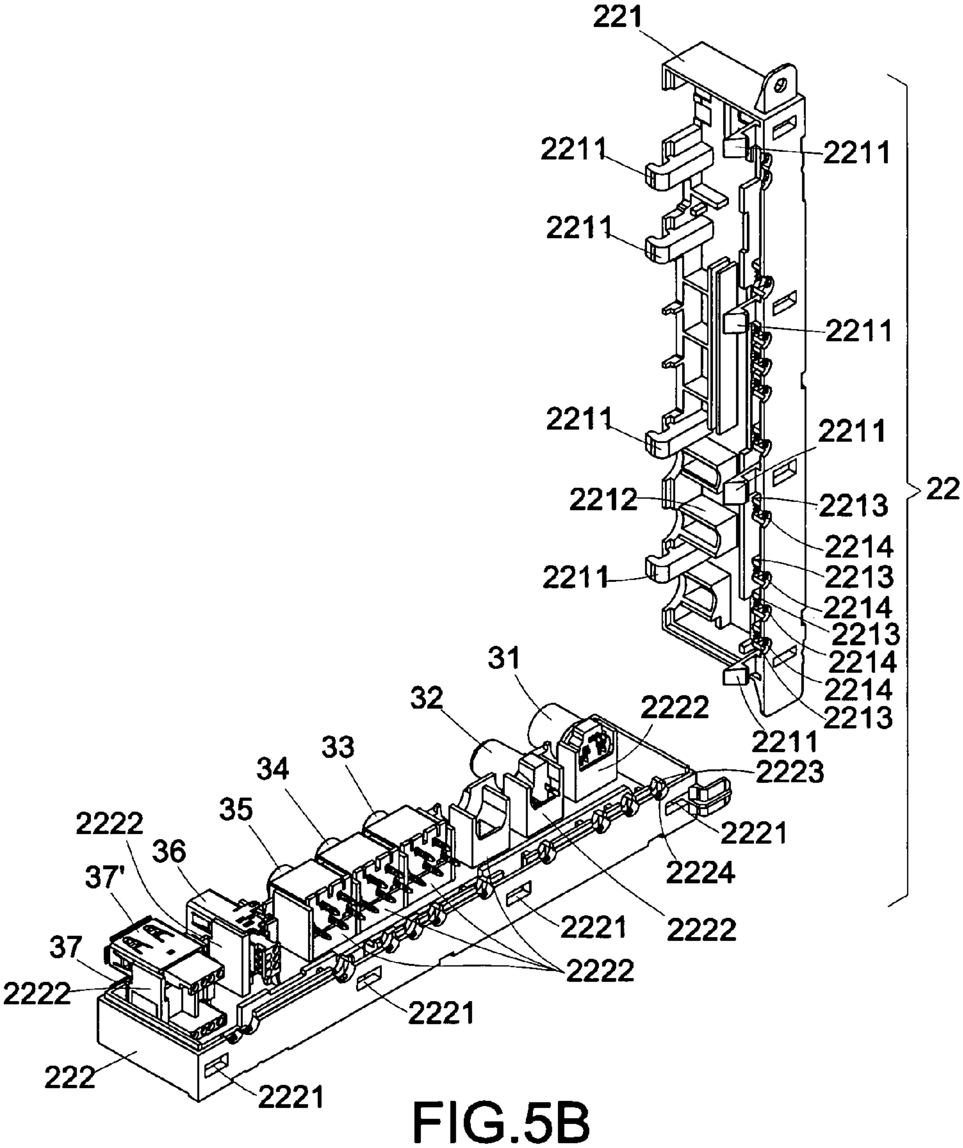
FIG. 5B is another exploded view showing the base seat and connecting ports according to the present invention.

Furthermore, referring to FIGS. 5A and 5B, where the base seat 22 is combined and mutually held by an upper cover 221 and a correspondent lower seat 222, in which multiple lockers 2211 are provided at the proper positions inside the upper cover 221. The said lockers 2211 are installed to correspond to the lock holes 2221 of lower seat 222 to provide a locking mechanism during assembling. In addition, multiple embed seats 2212, 2222 are respectively provided inside the upper cover 221 and the lower seat 222 for embedding and fixing connector. The connectors to be fixed include: S terminal 31, video connecting port 32, audio connecting port 33, microphone output port 34, expanded audio output port 35, IEEE 1394 port 36, and USB ports 37, 37', etc. Moreover, accept seats 2213, 2223 with smaller diameters are provided at the back sides of corresponding embed seats 2212, 22222. The accept seats 2213, 2223 are provided for fixing the wiring. Thus, engage parts 2214, 2224 are provided at the accept seats 2213, 2223 to hold and fix the connect wires.

Figure 6A:
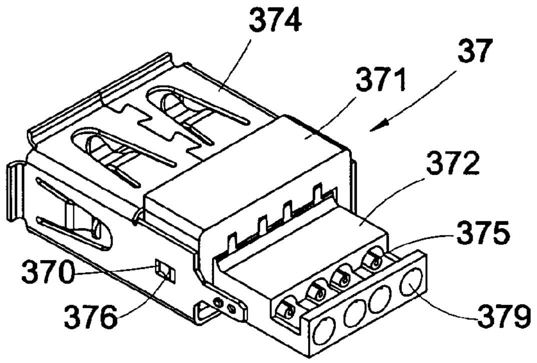
FIG. 6A shows the assembly of USB port according to the present invention.
Figure 6B:
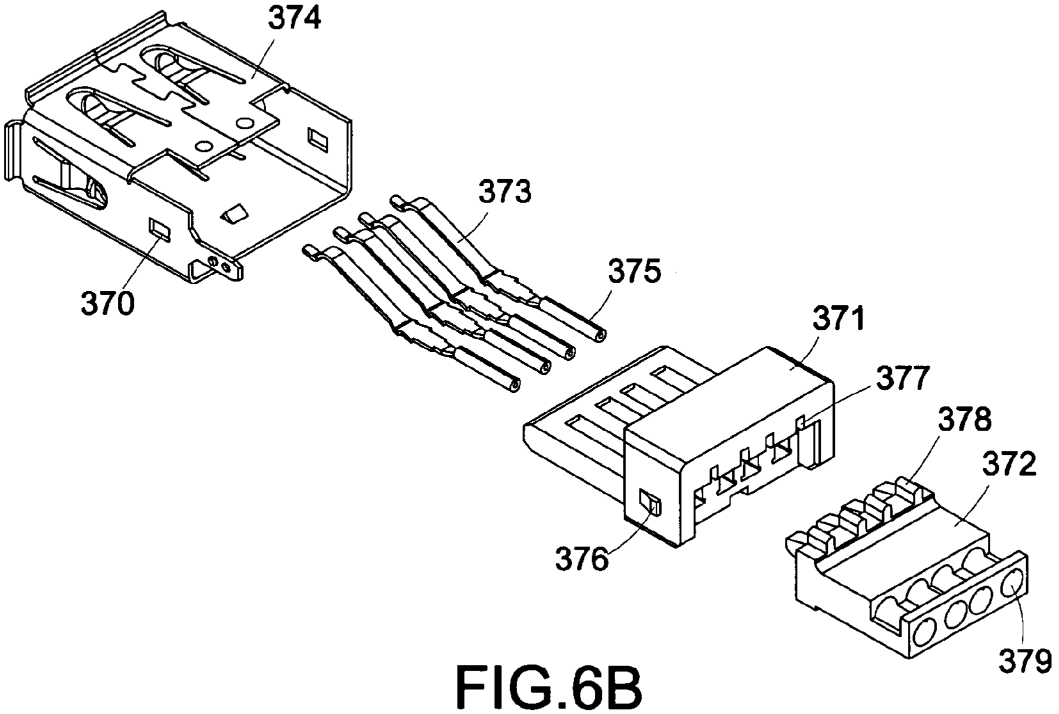
FIG. 6B shows the exploded view of USB port according to the present invention.

Between the diverse connectors, the inventor aimed at the USB connecting port 37 and provided another structural improvement, as shown in FIGS. 6A and 6B, in which USB connecting port 37 mainly includes a base case 374, a lock seat 371, an inlay seat 372, and multiple connecting terminals 373. To compare with the conventional structure, the present invention divides the originally single plastic seat into a lock seat 371 and an inlay seat 372. Hold parts 375 are directly formed at the back side of the connecting terminals 373 embedded in the lock seat 371, and are thus installed inside the hole slots 379 at the back side of inlay seat 372 for accepting insertion of wiring.

Additionally, the lock seat 371 and inlay seat 372 are assembled by embedding the channels 377 at the back wall of lock seat 371 to correspondent embed parts 378 at the front end of inlay seat 372. Besides, the lock part 376 provided at the lateral of lock seat 371 corresponds to the lock hole 370 of base case 374, the lock seat 371 thus can be locked inside the base case 374 and completes the assembly of USB connecting port 37.

Figure 7A:
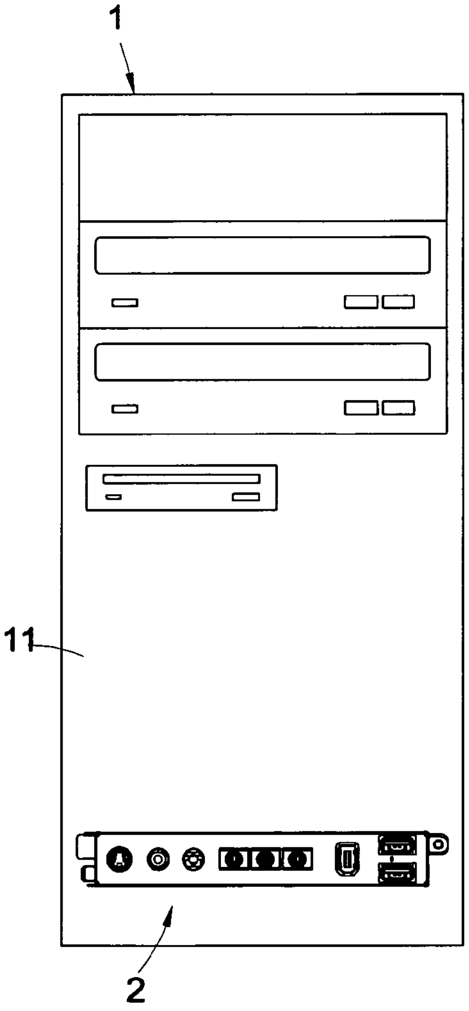
FIG. 7A is a pictorial drawing showing an embodiment of the present invention on the front panel of PC.
Figure 7B:
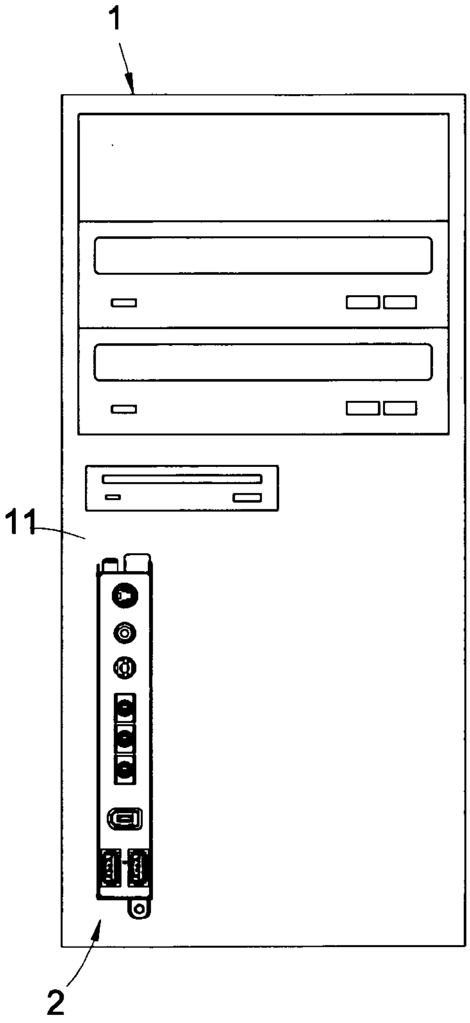
FIG. 7B is a pictorial drawing showing another embodiment of the present invention on the front panel of PC.

Further, referring to FIGS. 7A and 7B, where the connecting interface 2 according to the present invention can be laterally or longitudinally installed on the front panel 11 of PC 1 to meet the arrangement of the front panel 11 of PC 1 or internal main board.

Consequently, according to the present invention, the modular structure for connecting interface on front panel of PC case not only takes the convenience of users into account, but as well integrates the fields of main board and PC case such that the connecting ports are modualized on the front panel of PC.

The invention claimed is:

1. A modular structure for connecting interface on front panel of PC case, which is a connecting interface installed on the PC, where the connecting interface at least includes:

a case, which is a component for fixing the whole connecting interface on the front panel of PC case;

a base seat, which is formed from mutually engaging an upper cover and a lower seat, while corresponding embed seats and accept seats are provided inside the base seat for embedding connecting ports, and wiring for input or output is provided at the back side; and multiple connecting ports, for accepting insertion of connectors with specified specification;

such that the said connecting interface integrating connecting ports for input/output is installed on the front panel of PC, and thus ease the expanding and connecting for data input/output by the user.

2. A modular structure for connecting interface on front panel of PC case in accordance with claim 1, wherein the connecting port on the interface module can be embodied as an S terminal or a video connecting port or an audio connecting port or a microphone output port or an expanded audio output port or an IEEE 1394 port or an USB connecting port.

3. A modular structure for connecting interface on front panel of PC case in accordance with claim 2, wherein the USB connecting port may includes:

a base case, which is a metal case for containing the lock seat, and lock hole is installed laterally;

a lock seat, which is provided for installing connecting terminals and for assembling to the inlay seat, in which lock part is provided laterally to correspond to the lock hole of base case;

a inlay seat, which is installed at the back side of lock seat and hole slots are provided for accepting the hold parts of connecting terminals; and multiple connecting terminals, where the said connecting terminals are provided for connecting USB port to the base seat, and a hold part is formed at the back side of each terminal for insertion and assembling of wiring.

4. A modular structure for connecting interface on front panel of PC case in accordance with claim 3, wherein the lock seat provides channels at back wall to correspond to the embed part at the front end of inlay seat, such that the channels and the embed part can be assembled and held mutually.

* * * * *